United States Patent [19]
Fehr

[11] Patent Number: 5,640,897
[45] Date of Patent: Jun. 24, 1997

[54] MEAT AND CHEESE SLICER FOR A PIZZA FINGER MACHINE

[76] Inventor: Amos Fehr, 4567 Zimmerman Ave., Niagara Falls, Ontario, Canada, L2E 3M5

[21] Appl. No.: 592,851

[22] Filed: Jan. 24, 1996

[51] Int. Cl.⁶ .................. A21C 9/00; A23P 1/00
[52] U.S. Cl. .............. 99/450.1; 99/494; 83/121; 83/406.1; 83/932
[58] Field of Search ............ 99/450.1–450.8, 99/494, 537; 83/112, 121, 406.1, 367, 597, 746, 762, 932; 118/15; 425/113, 297, 308, 324.1; 426/30, 141, 448; 452/30, 141, 148

[56] References Cited

U.S. PATENT DOCUMENTS

| | | | |
|---|---|---|---|
| 3,788,030 | 1/1974 | Moline | 83/620 X |
| 3,842,698 | 10/1974 | Fitch et al. | 83/490 X |
| 4,060,027 | 11/1977 | Jenny | 99/450.1 |
| 4,112,834 | 9/1978 | Thiry | 99/494 X |
| 4,393,758 | 7/1983 | Anmahian | 99/450.6 |
| 5,012,726 | 5/1991 | Fehr et al. | 99/450.6 |
| 5,085,138 | 2/1992 | Fehr et al. | 99/450.7 X |
| 5,121,677 | 6/1992 | LeClaire et al. | 99/357 |
| 5,190,780 | 3/1993 | Fehr et al. | 426/94 X |
| 5,243,899 | 9/1993 | Moshier et al. | 99/450.1 |
| 5,287,781 | 2/1994 | Fehr et al. | 83/932 |
| 5,499,578 | 3/1996 | Payne | 99/537 |
| 5,517,904 | 5/1996 | Vargas et al. | 99/450.1 |

*Primary Examiner*—Timothy F. Simone

[57] ABSTRACT

This machine is a compound cutting and shearing device which is capable of removing slices of sausage meat from a bulk sausage stored in the machine and delivering the sliced sausage to a precise location on a food product located adjacent the machine. Simultaneously, the machine has a shearing device which shears a finger of cheese from a bulk slab of cheese stored in the machine and delivers the sheared finger of cheese to a precise location on the previously delivered sliced sausage meat.

15 Claims, 15 Drawing Sheets

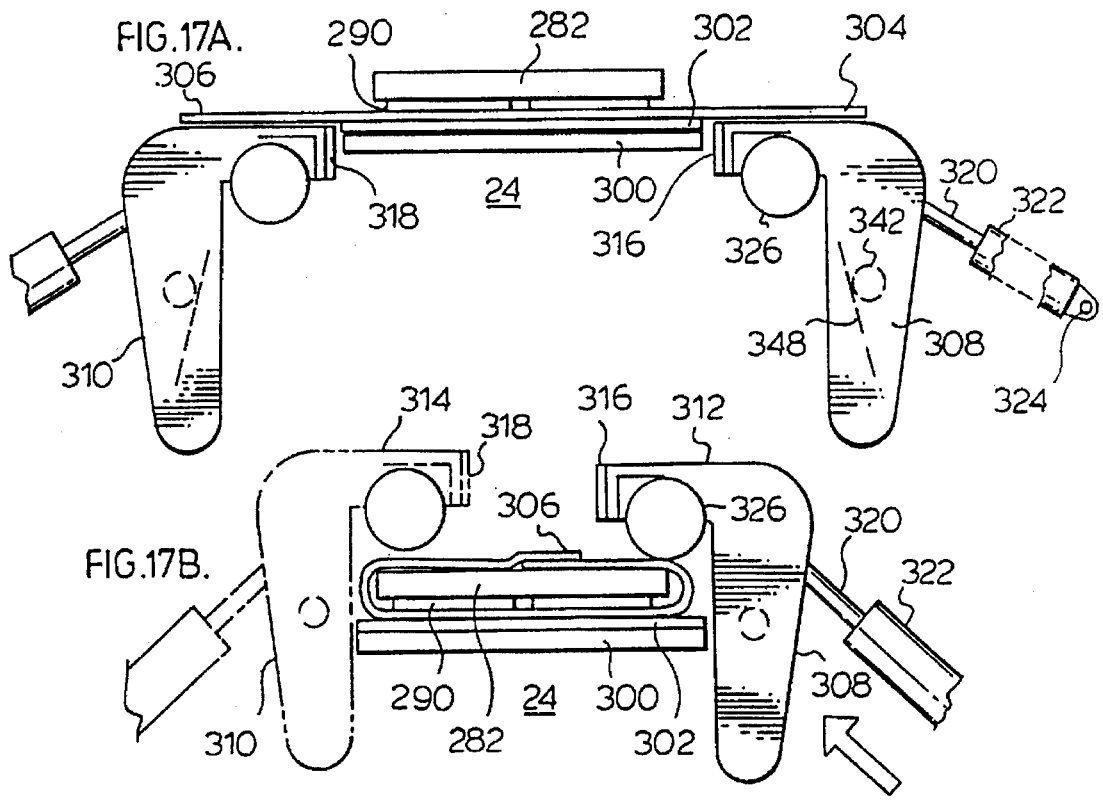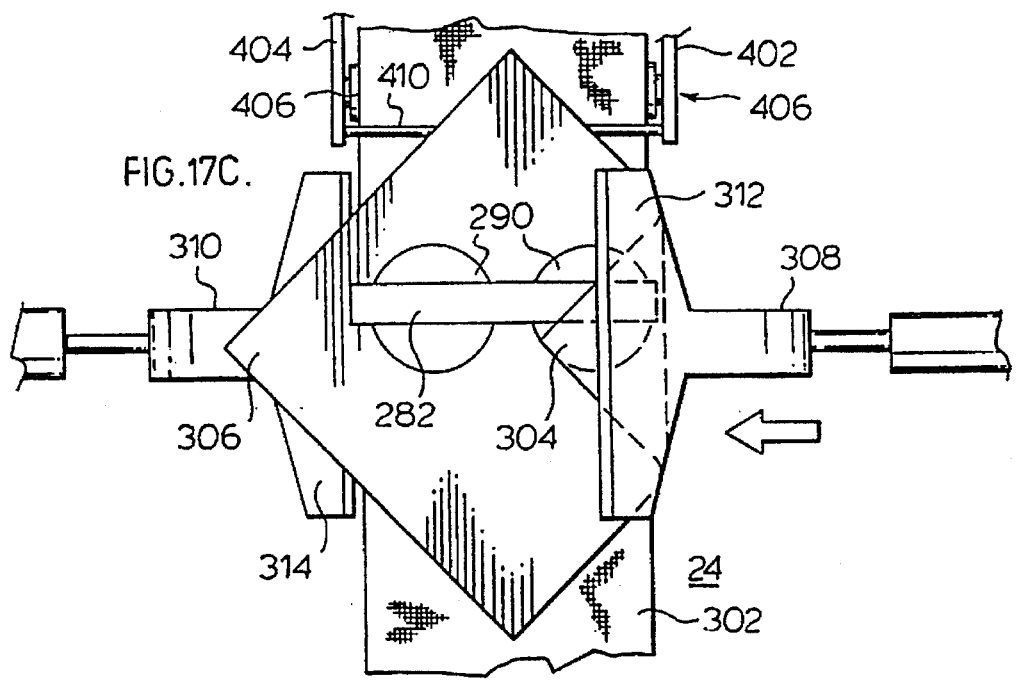

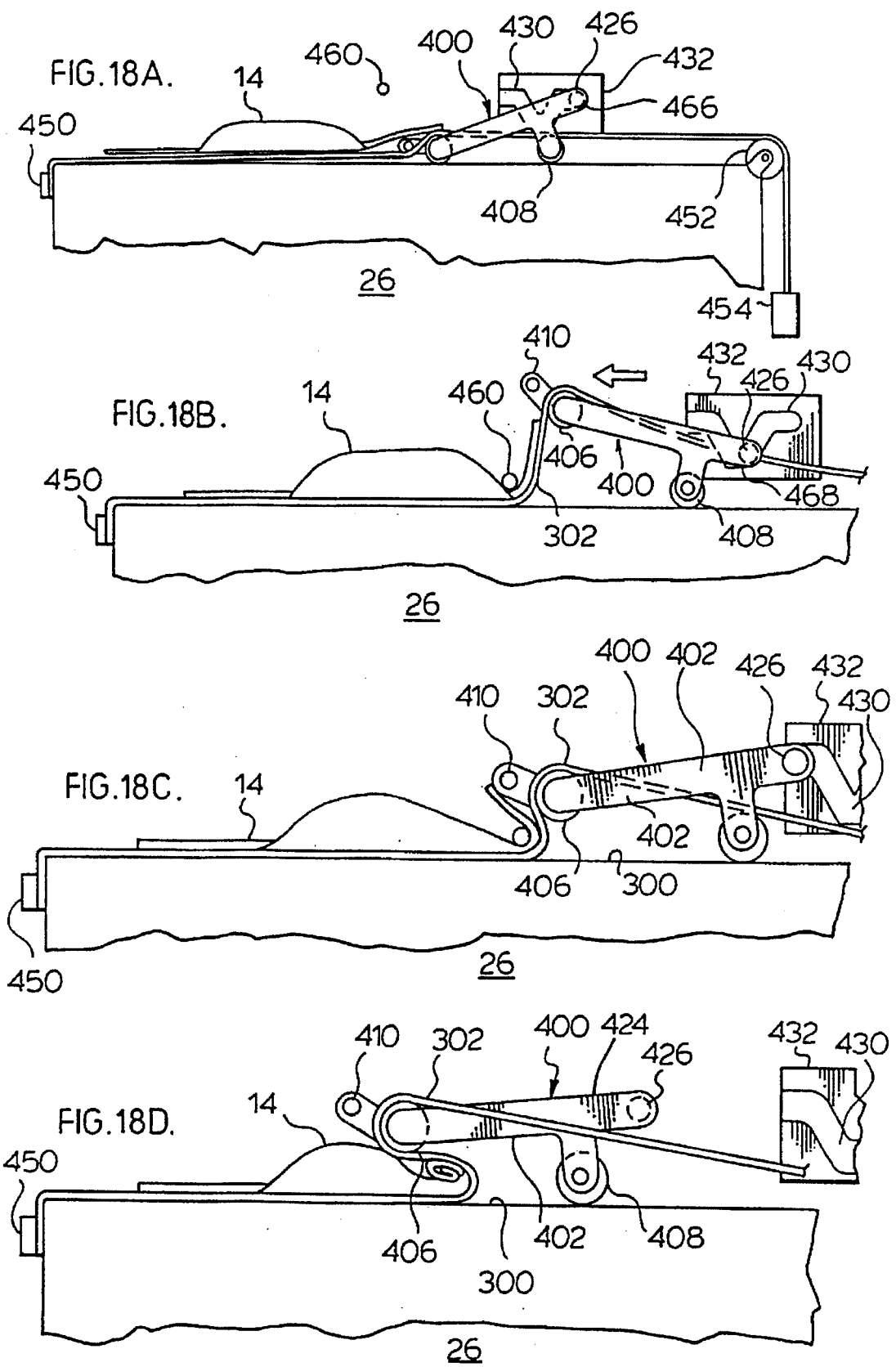

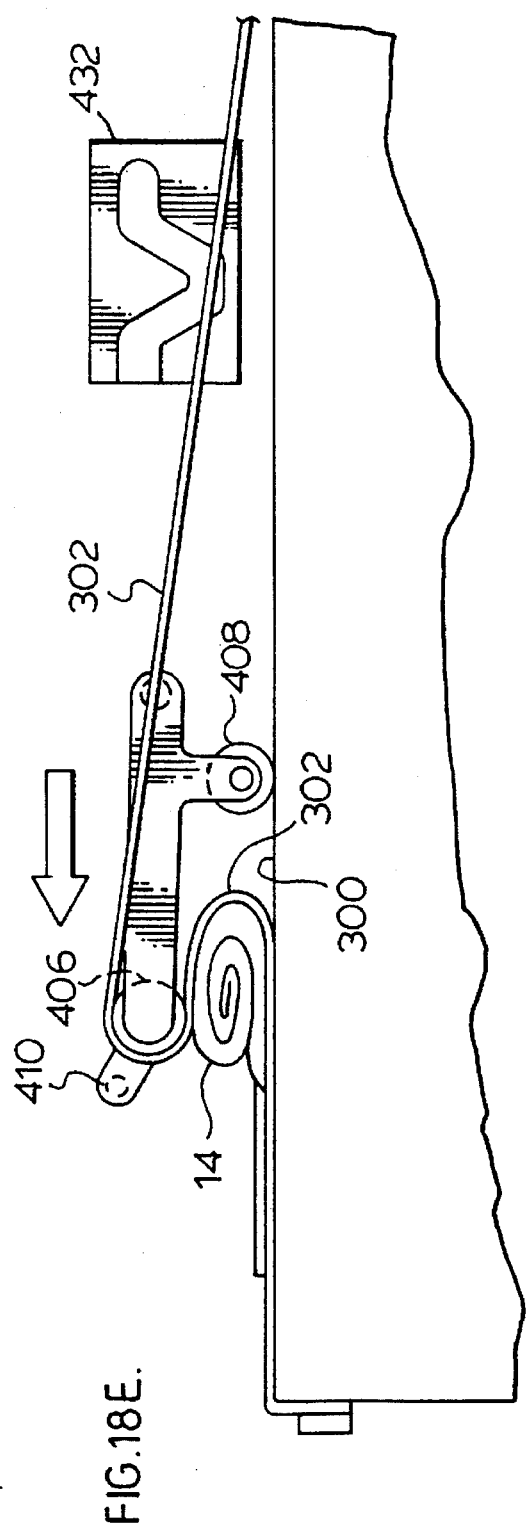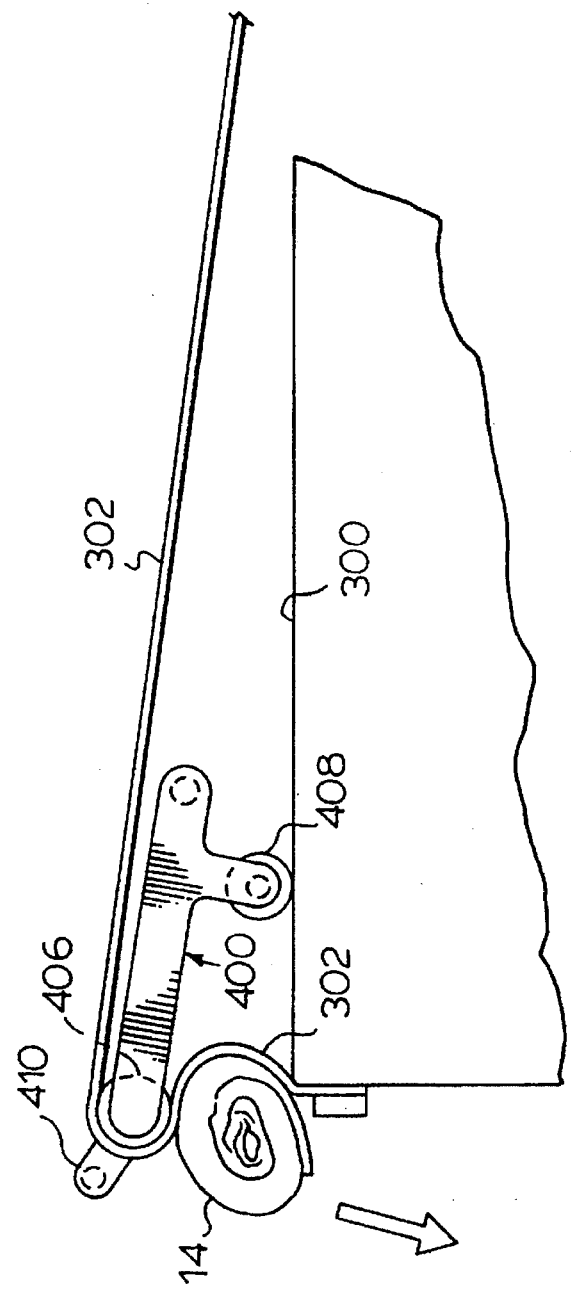

MEAT AND CHEESE SLICER FOR A PIZZA FINGER MACHINE

This invention relates to an apparatus and a method for producing a filled food product. The product to which this invention applies is generally referred to as a "pizza finger" or "pizza roll" but the invention may find suitable application in the manufacture of other rolled food products which encapsulate some kind of filling.

The invention is basically a machine which is able to take five basic components, assemble and place each of the components in a predetermined place at a predetermined time in a predetermined sequence to produce a filled food product. The machine is supplied with dough in the form of a sheet of about 6"×6" which is laid down on a platen in a diamond configuration and when deposited on the platen, tomato paste and an egg mixture (or other similar substance) are deposited on the surface of the dough sheet in predetermined locations. When the dough sheet has received the appropriate amounts of tomato paste and egg mixture, a predetermined number of pepperoni slices are deposited on the previously prepared dough sheet. The pepperoni slices have to be carefully deposited on the dough sheet again at a very precise location, and a finger of cheese (preferably mozzarella) of elongated nature, is deposited on the pepperoni pieces previously deposited on the dough sheet. The location and orientation of the cheese finger is extremely important to the production of the end product.

The dough sheet previously covered with tomato paste, egg mix, pepperoni slice(s) and cheese finger is now folded and rolled. The two pointed "sides" of the diamond oriented covered dough sheet are now folded inwardly to overlap one another in the center of the dough sheet and cover the deposited ingredients on the now folded dough sheet.

The folded dough sheet is now "rolled" by rolling one of the pointed ends up and over the previously folded dough sheet to initiate the rolling process. To continue the rolling process, the body of the roll is now rotated to continue the rolling process initiated by the initial rolling up the pointed end of the dough sheet.

The finished product is rolled on a fabric which is deformed and maneuvered to complete the rolling process. The rolled food product may now be dispensed into a suitable conveyor or receptacle.

BACKGROUND OF THE INVENTION

The production of the food product commonly known as a pizza finger has traditionally been accomplished by manual labor. Serious attempts have been made to automate the process previously carried out by labor intensive operation but to date without success.

Because only five ingredients are required to be processed to provide the complete end product (more ingredients may be added if desired) and the process really requires placement of four ingredients on a dough sheet, the manufacture of the end product should be a relatively uncomplicated process. The prior art will illustrate that although the process appears straight forward, to those skilled in the art the successful manufacture of a filled product is anything but simple.

The prior art listed hereinafter is a testament to the complexity of this invention.

RELATED PRIOR ART

| Canadian Patent application 2,017,812, Fehr published Nov. 30, 1991 | |
| --- | --- |
| Canadian Patents: | |
| 586,999 | Wolf - November 17, 1959 |
| 1,006,050 | Hai - March 1, 1977 |
| 1,024,825 | Trostman et al - January 24, 1970 |
| 1,260,318 | Fehr - September 26, 1989 |
| U.S. Pat. Nos.: | |
| 3,611,950 | Battasglia - October 12, 1971 |
| 3,669,007 | Pulici - June 13, 1972 |
| 3,780,643 | Papal - December, 1973 |
| 3,912,433 | Ma - October 14, 1975 |
| 4,014,245 | Kawa - March 29, 1977 |
| 4,060,027 | Jenny - November 29, 1977 |
| 4,073,953 | - February 14, 1979 |
| 4,084,493 | Quinlana - April 18, 1978 |
| 4,112,834 | Thing - September 12, 1978 |
| 4,388,059 | Ma - June 14, 1987 |
| 4,393,758 | Anmahian - July 19, 1983 |
| 4,439,124 | Watanabe - March 27, 1984 |
| 4,640,670 | Svengren - February 3, 1987 |
| 4,651,635 | Ally - March 24, 1987 |
| 4,691,627 | Roberts - September 8, 1987 |
| 4,716,821 | - January, 1988 |

SUMMARY OF THE INVENTION

This application describes a machine which takes raw material and processes the raw material into a finished, filled, food product. The machine is particularly adapted to the preparation of pizza type food product which is generally referred to as a "PIZZA FINGER".

The machine takes dough from a dispenser and cuts and delivers a diamond shaped dough sheet to a complex platen which generally presents a flat surface made up of mechanical devices which are capable of operating on the deposited dough sheet to fold and wrap and roll the dough sheet into a folded roll.

The sheet when deposited on the platen is immediately spotted with patches of tomato paste and egg mix by the apparatus which delivers the dough sheet to the complex platen.

A pepperoni-mozzarella cheese slicing machine lays down (usually 2) slices of thinly sliced pepperoni, and then deposits a previously sliced mozzarella cheese finger atop the pepperoni slices.

The complex platen undergoes surface motion that folds the loaded dough sheet from one side and then folds the opposite side, after which a fabric cloth is moved by a device which is capable of distorting the flat surface of the fabric to cause the folded dough sheet to undergo a rolling process.

BRIEF DESCRIPTION OF THE DRAWINGS

FIG. 17A and B show the dough folding machine in elevation before and after the dough sheet folding operation;

FIG. 17C shows a plan view of the dough folding machine of FIGS. 17A and B with the dough sheet partially folded;

FIGS. 18A–18F show an elevational representation of the dough sheet rolling device of the invention.

DESCRIPTION OF THE PREFERRED EMBODIMENT

Figure 1:
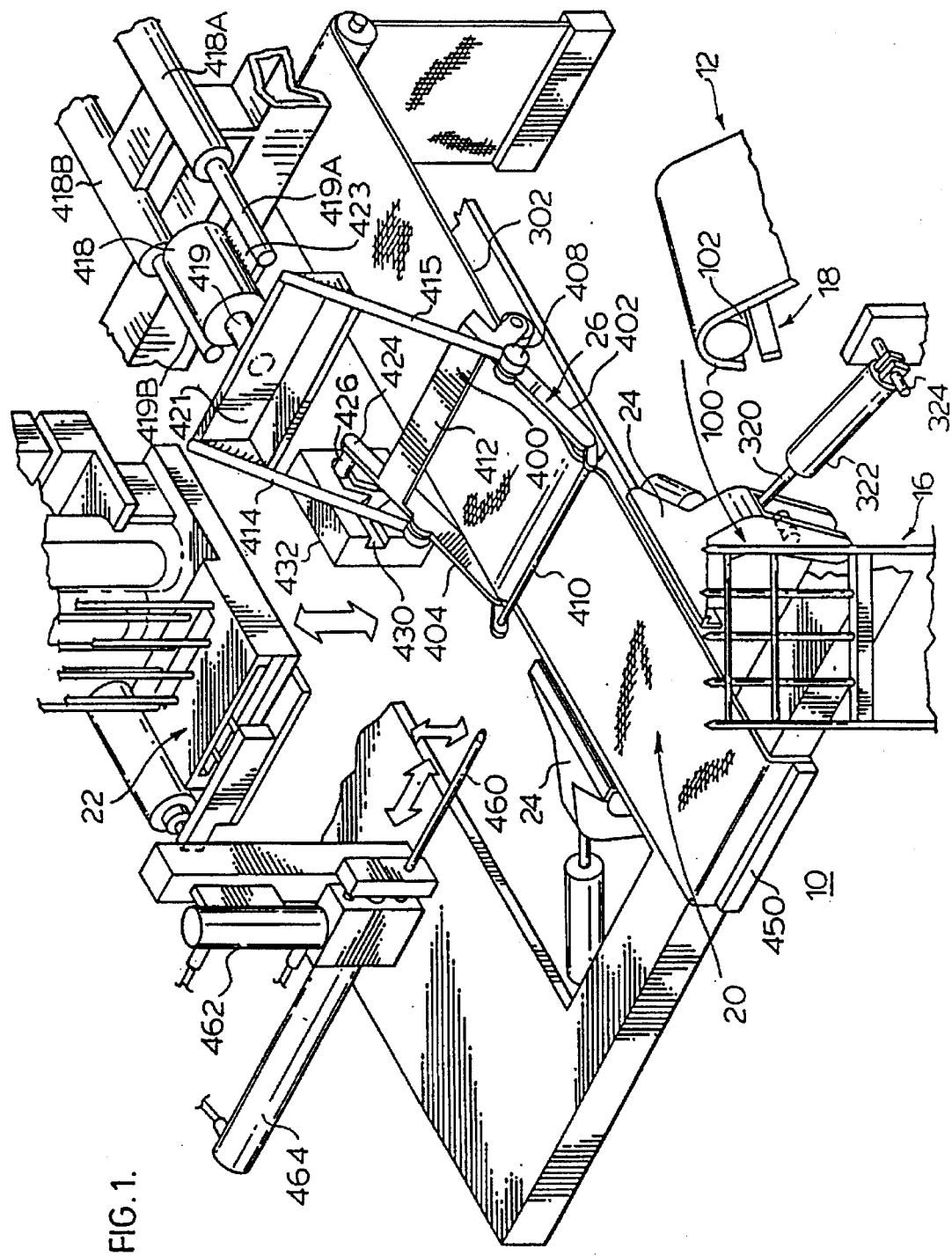
FIG. 1 is a perspective representation of the overall machine showing the separate components as they are located on the machine.

Referring to FIG. 1, a representation of the basic machine 10 is shown. A dough sheet dispensing apparatus 12 is shown feeding a dough strip 100 to a dough sheet transporting apparatus 16.

The dough is cut into pieces of about 6" lengths by shear 18, and the dough sheet transporting mechanism delivers the cut dough sheet to platen 20.

Platen 20 comprises a complex horizontal surface which will be described later, but the dough sheet is delivered to the platen so that it rests on the platen in a horizontal fashion. Tomato paste and an egg mixture are delivered to the top surface of the dough sheet in a process to be described later.

Next a pepperoni-cheese delivery machine 22 is brought into close proximity with the upper surface of the dough sheet bearing the tomato paste and the egg mixture. Some pepperoni slices are delivered to the dough sheet, and a cheese finger (preferably mozzarella) is delivered to be deposited on the pepperoni slices. The pepperoni-cheese delivery machine 22 is retracted from its dispensing location and the two sides of the dough sheet are folded over by folding device 24. The folded dough sheet is next rolled by rolling device 26.

Because of the complexity of the machine, each section will be described separately in the following description.
Dough Cutting and Transporting Device To provide an aid to the understanding of the processes carried out by this invention, reference is first made to the illustrations in FIGS. 2A through 2J for the operating sequences and dough sheet manipulation used by the machine of this invention.

Figure 2A:
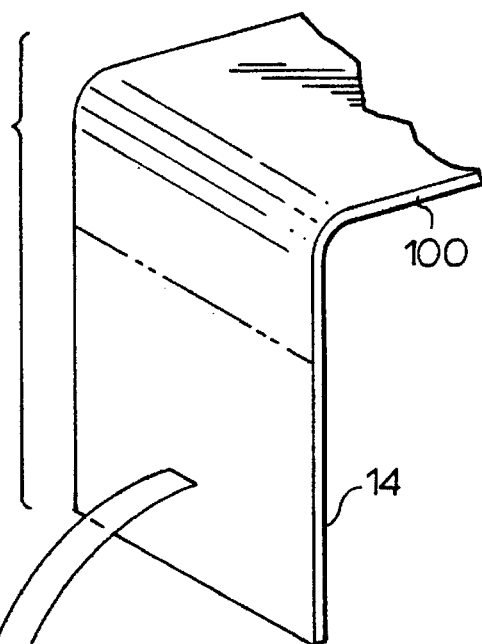
FIG. 2A–2J show the basic representation of the process applied to the dough sheet.

FIG. 2A shows an illustration of the dough sheet 14 having been severed from dough strip 100.

Figure 2B:
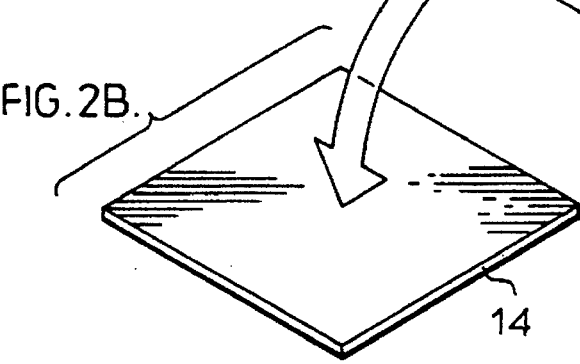

FIG. 2B shows the dough sheet 14 aft having been transferred to the horizontal "loading" position.

Figure 2C:
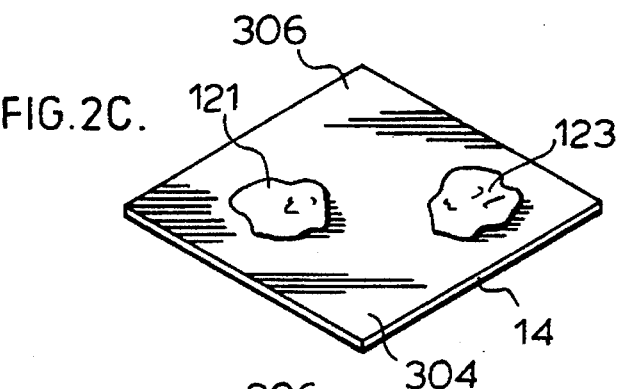

FIG. 2C shows the horizontal dough sheet 14 after having tomato paste 121 and egg mix 123 dispensed on the surface of dough sheet 14.

Figure 2D:
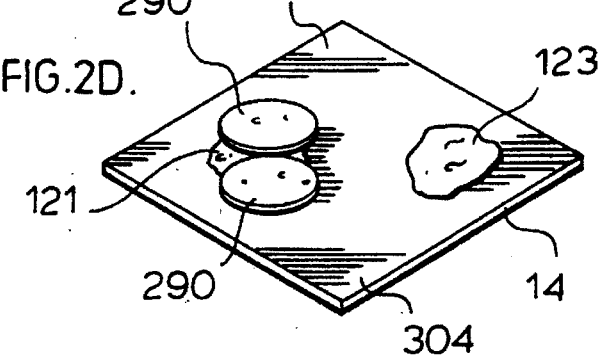

FIG. 2D shows the dough sheet of FIG. 2C now having a pair of pepperoni slices 290 deposited on the tomato paste deposit 121 on dough sheet 14.

Figure 2E:
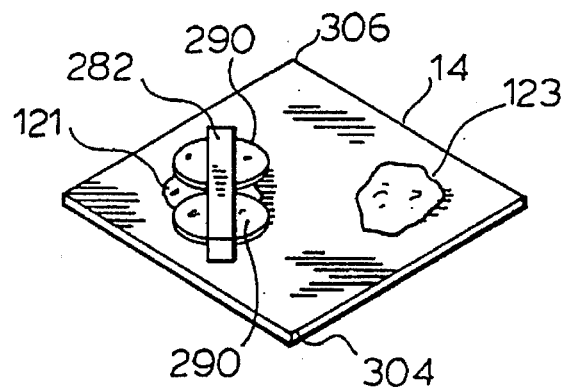

FIG. 2E shows a cheese finger 282 deposited on the pair of previously placed pepperoni slices 290 of FIG. 2E.

Figure 2F:
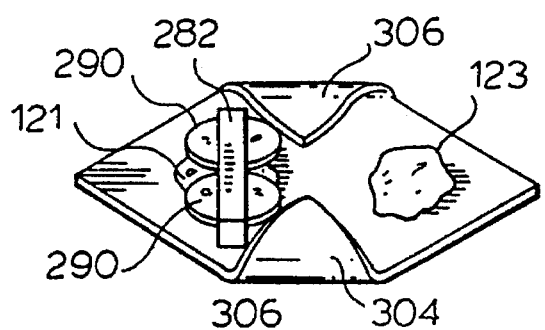

FIG. 2F shows the sequence of folding points 304 and 306 of dough sheet 14 over the central portion thereof.

Figure 2G:
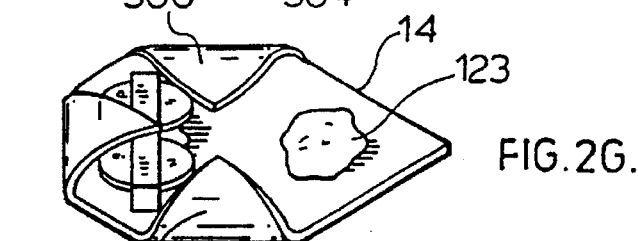

FIG. 2G shows the initiation of the rolling process as it applies to the folded dough sheet of FIG. 2F.

Figure 2H:
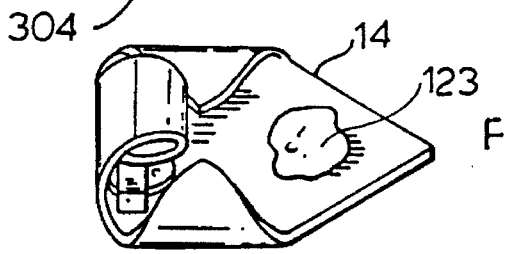

FIG. 2H shows the continuation of the rolling process and the dough sheet 14 configuration.

Figure 2I:
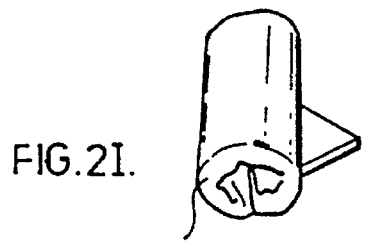
Figure 2J:
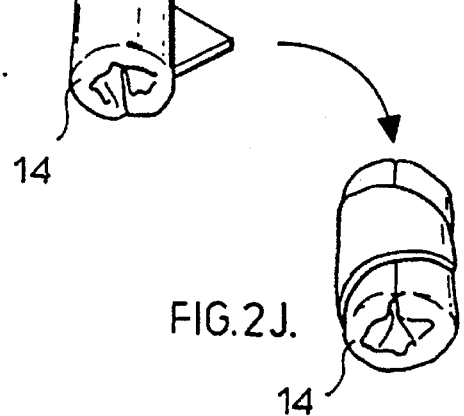

FIG. 2I and 2J show the intermediate and final configurations of the dough sheet 14.

Figure 3:
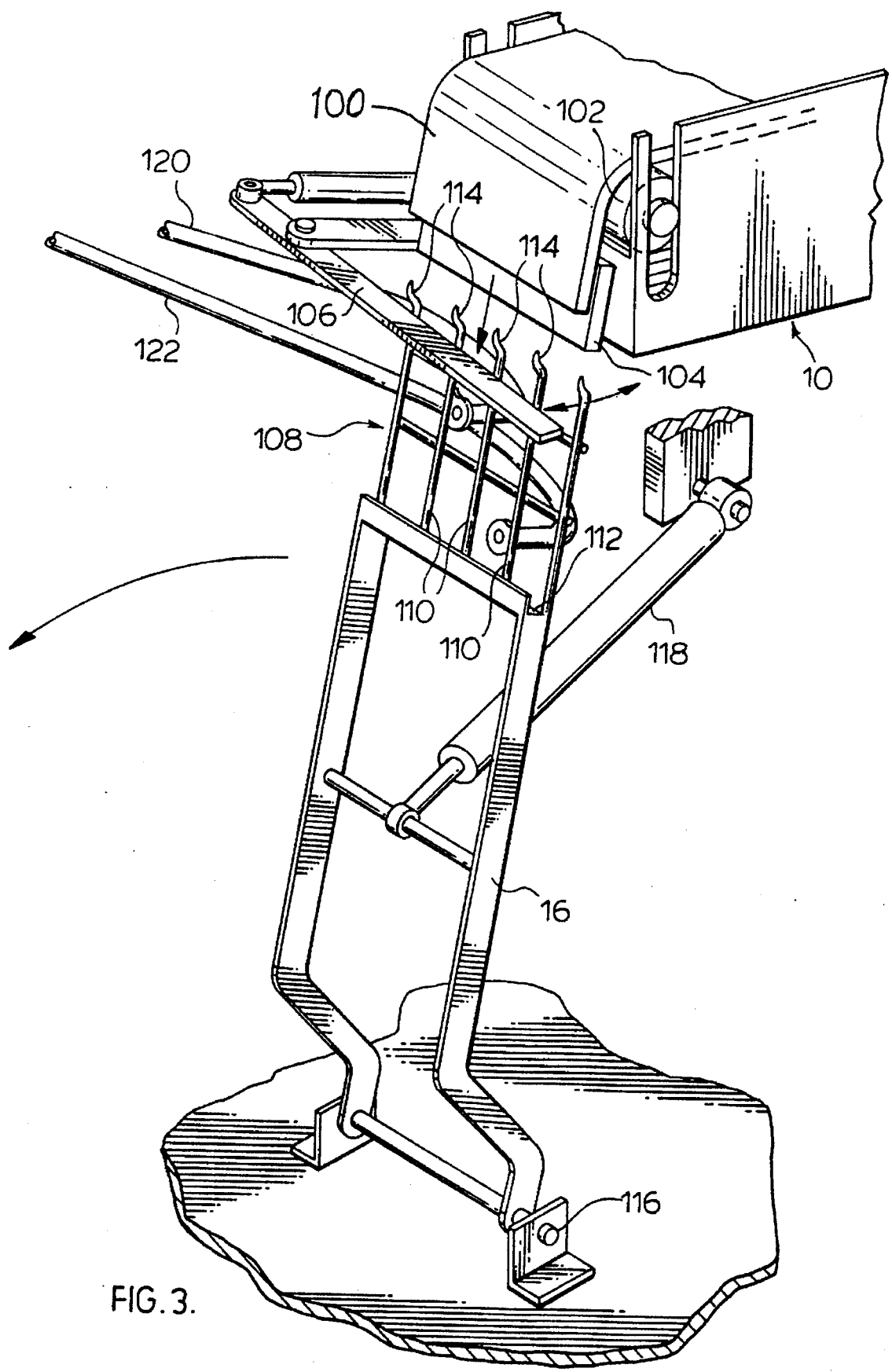
FIG. 3 is a perspective view of a dough sheet delivery apparatus, a dough strip cutter and a dough sheet transfer device.
Figure 4:
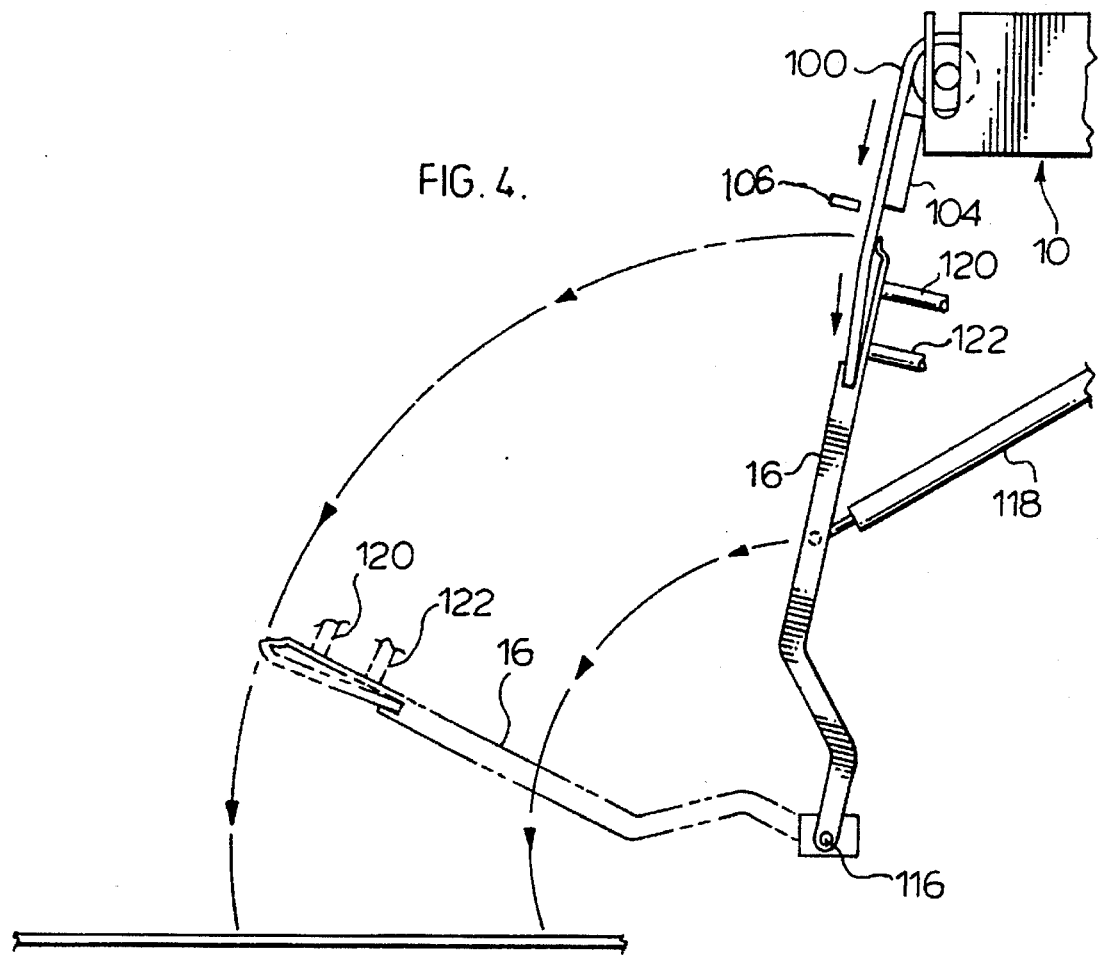
FIG. 4 is a plan view showing the motion executed by the dough sheet transfer device.
Figure 5:
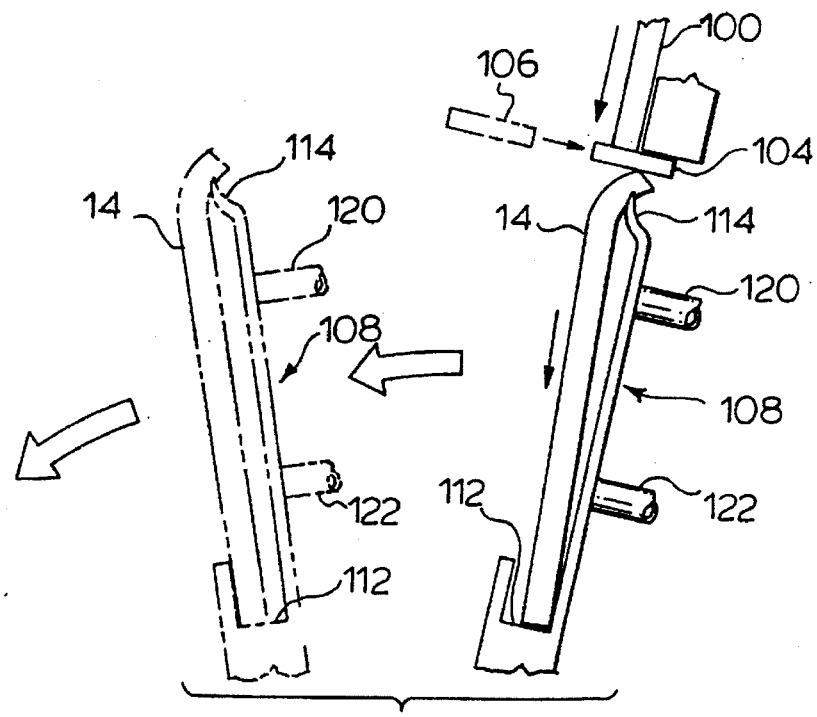
FIG. 5 is an enlarged section view of the dough sheet receiver shown in FIG. 4 shown in the loading position and at a position just slightly later after the transfer device has left the loading position.
Figure 6:
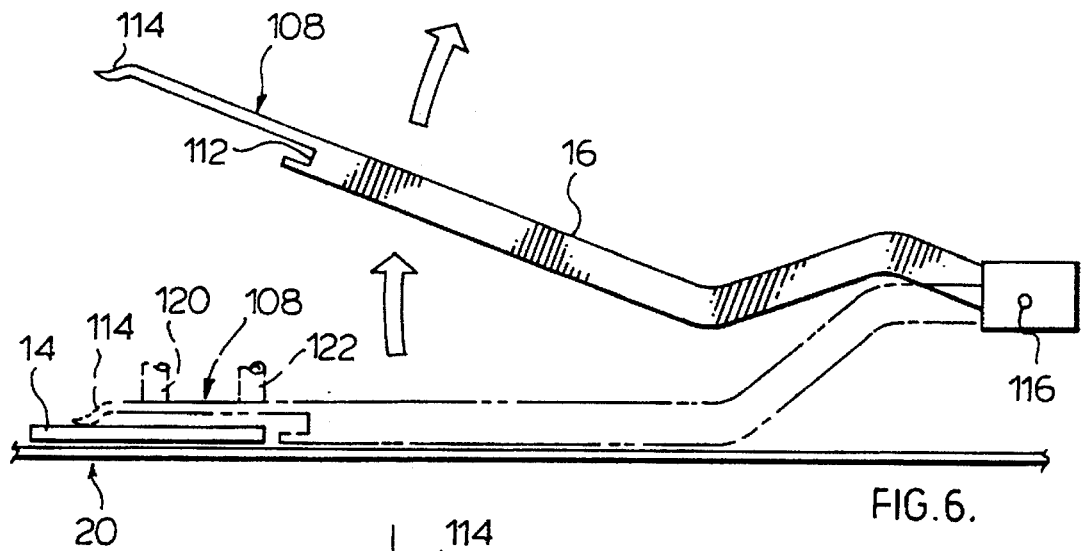
FIG. 6 is a plan view of the dough sheet transfer device showing the position occupied at the end of the delivery stroke and the beginning of the return stroke.
Figure 7:
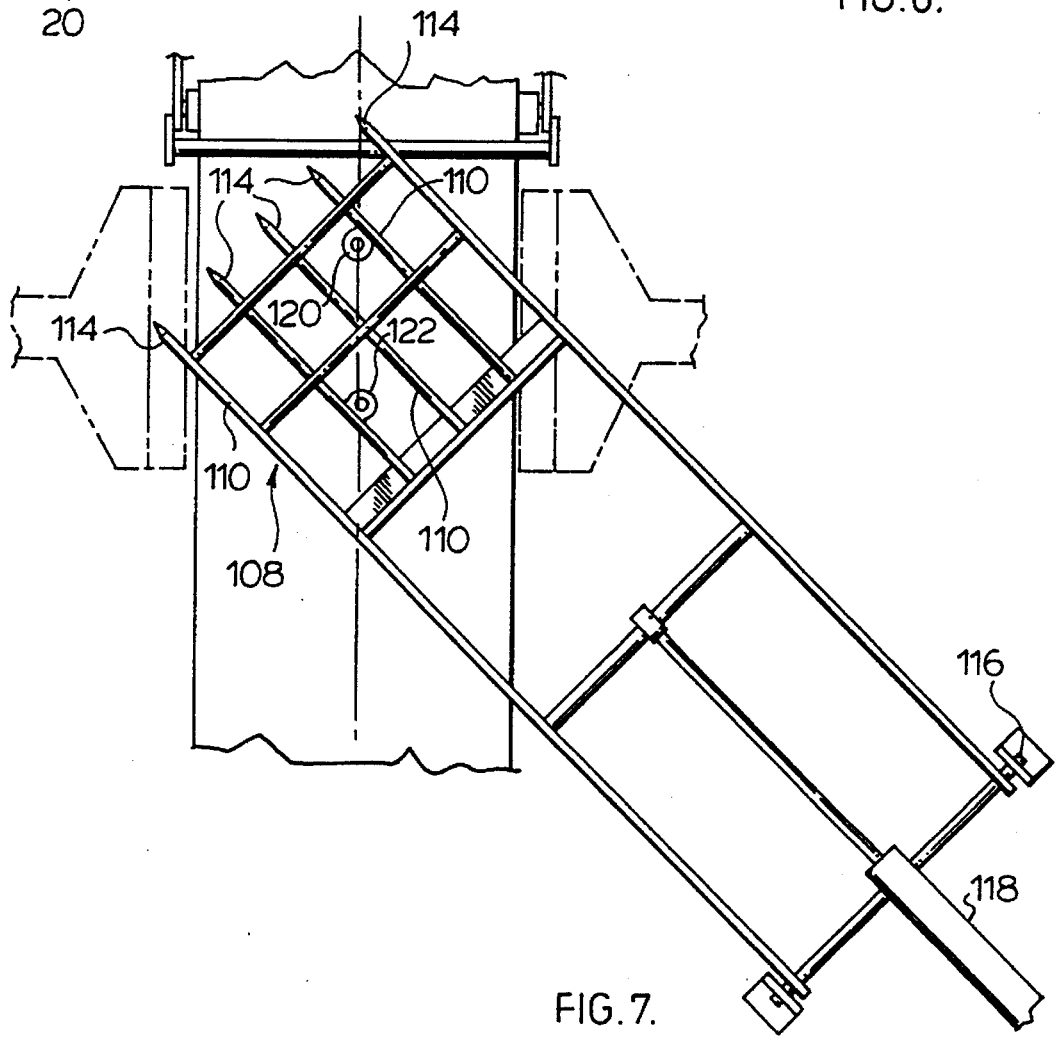
FIG. 7 is a plan view of the dough sheet transfer device and the platen which receives the dough sheet from the dough sheet transfer device.
Figure 11:
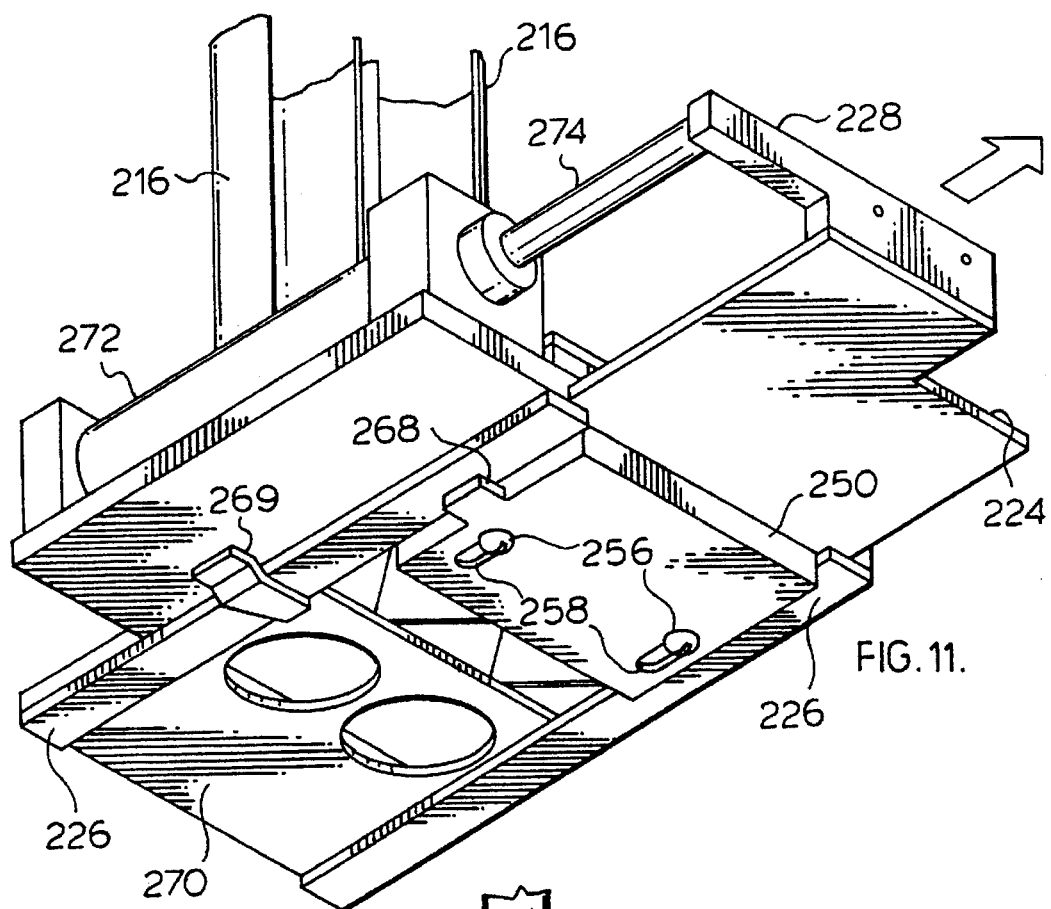
FIG. 11 is a bottom view perspective of the pepperoni-cheese slicing machine at the conclusion of a pepperoni slicing operation.

Referring now to FIG. 3 a dough strip dispensing device 10 is shown located adjacent and above dough sheet transfer device 16.

The dough delivery device 10 is shown as a dispenser of a dough strip 100 having a width of about 6". Device 10 may be a storage device for storing a folded previously manufactured dough strip (approximately 60–200 thousandth of an inch thick) or it may be a commercial dough manufacturing device which manufacturers the dough strip in situ and extrudes the dough strip 100 over roller 102 and through the pivoting guillotine 104. Blade 104 is pivoted from ledger bar 106 so as to sheer the dough strip 100 when a sufficient length of sheet 100 is received in receptacle 108 of the dough strip transporting apparatus 16.

The transporting apparatus is shown further in FIGS. 4, 5, 6 and 7. Here device 16 is shown having a dough receptacle 108 which in this instance is shown as a grill work 110 with exposed vertical bars 110 over which the dough sheet 14 slides as being fed from the dough strip dispensing mechanism 10. While in this instance a grill work is shown as a grill work, the receiving receptacle may be a continuous flat surface. The dough sheet 14 is guided into the shallow trough 112 and when the dough sheet has dropped sufficiently to reach the bottom of the trough 112, it is sheared by pivoting guillotine bar 106.

The dough sheet 14 has been fed into the dough sheet transporting device between the open blade 106 and its companion ledger plate 104 (which is stationary) and blade 106 is pivoted toward ledger plate 104 so as to simultaneously shear the dough strip 100 and push the dough sheet 14 previously dispensed into receptacle 108 onto the hooks 114 (FIG. 5) to secure the dough sheet 14 to the top of receptacle 108. The dough sheet transporting device 16 now swings about pivot 116 to deliver the dough sheet to the platen 20. Actuating device 118 is shown driving transfer mechanism 16 about pivot 116.

The dough sheet transporting device 16 in this instance has an offset shown in legs for reasons of economy and the pivot 116 is such that device 16 swings in a plane which is at 45° to the axis of the overall machine. This permits the dough transporting device 16 to deposit the cut dough sheet to the platen 20 in a horizontal "diamond" configuration.

Figure 8:
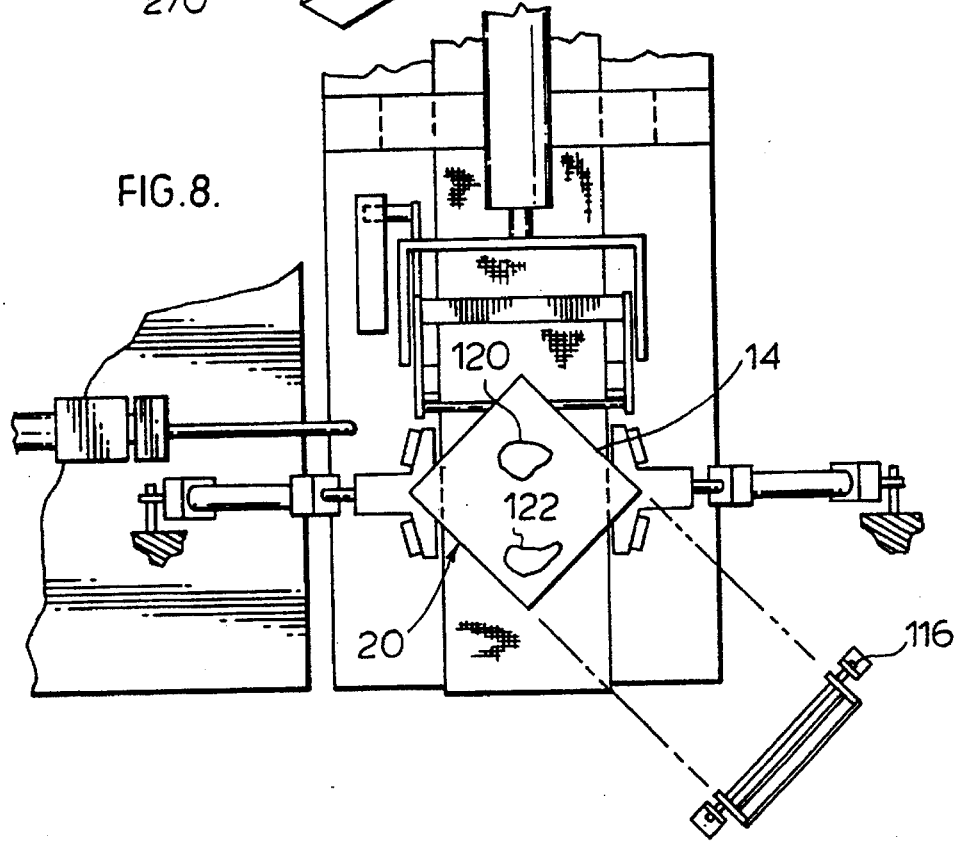
FIG. 8 shows a partially loaded dough sheet as placed by the dough sheet transfer mechanism of FIGS. 3, 4, 5, 6 and 7 on a platen.
Figure 9:
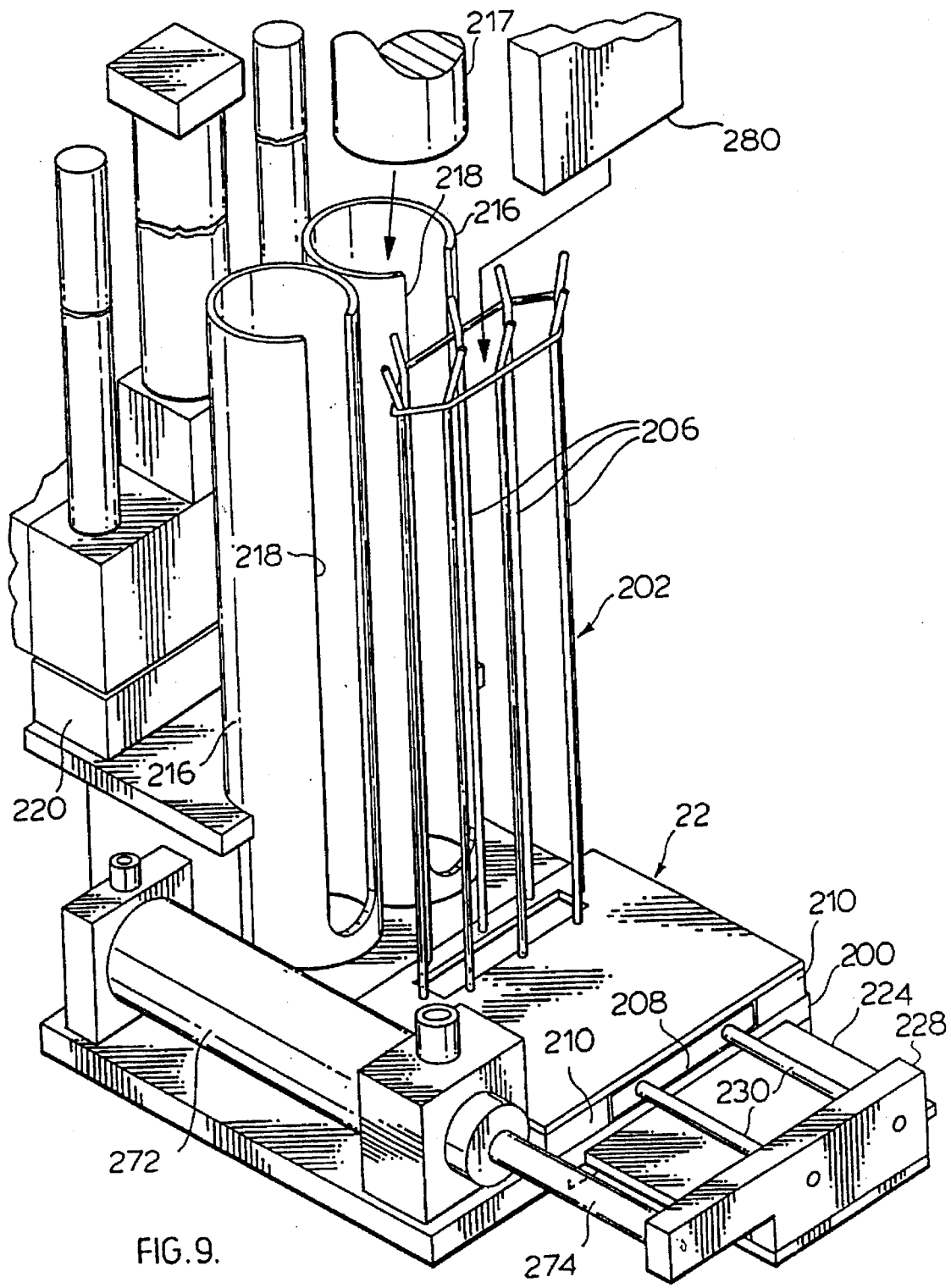
FIG. 9 is a perspective view of the pepperoni-cheese slicing machine of this invention.
Figure 10:
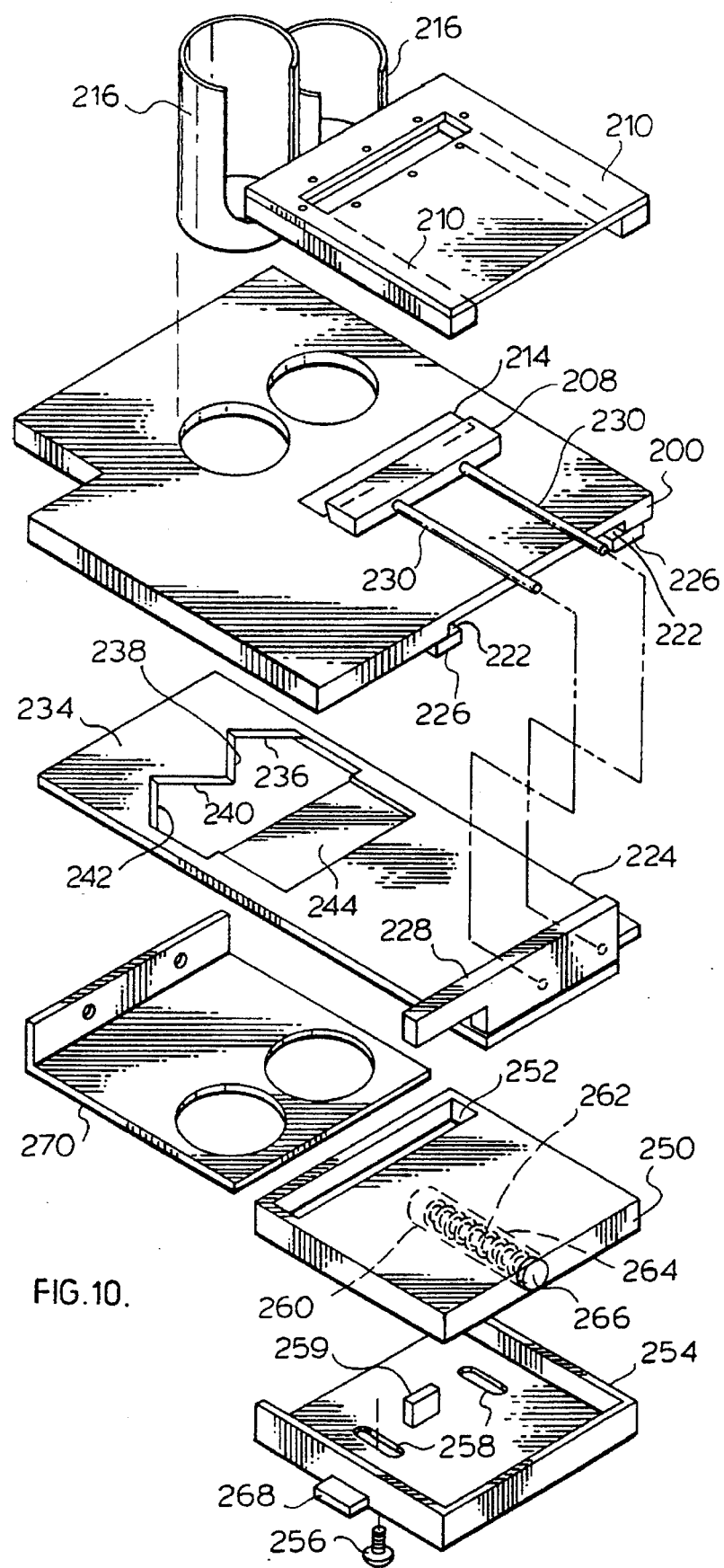
FIG. 10 is an exploded view of the pepperoni-cheese slicing machine of FIG. 9.
Figure 12:
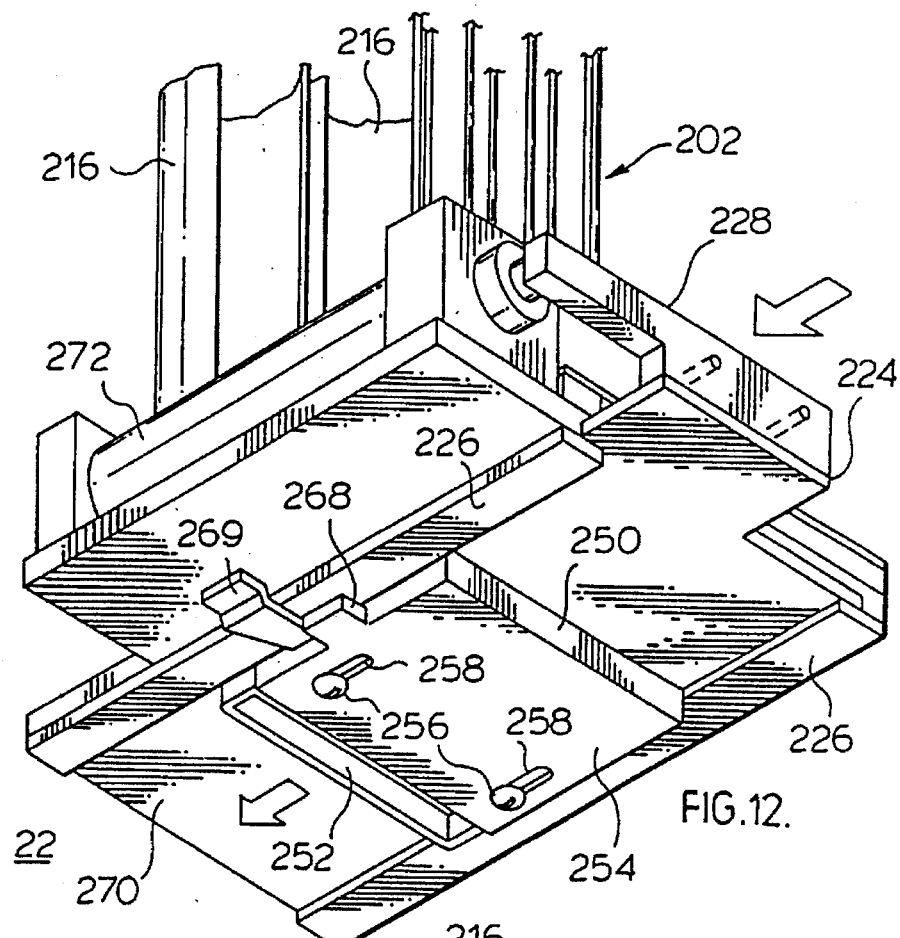
FIG. 12 is a bottom perspective view of a pepperoni-cheese slicing machine showing the cheese transport device in an open condition and at the conclusion of a cheese finger shearing operation.
Figure 13:
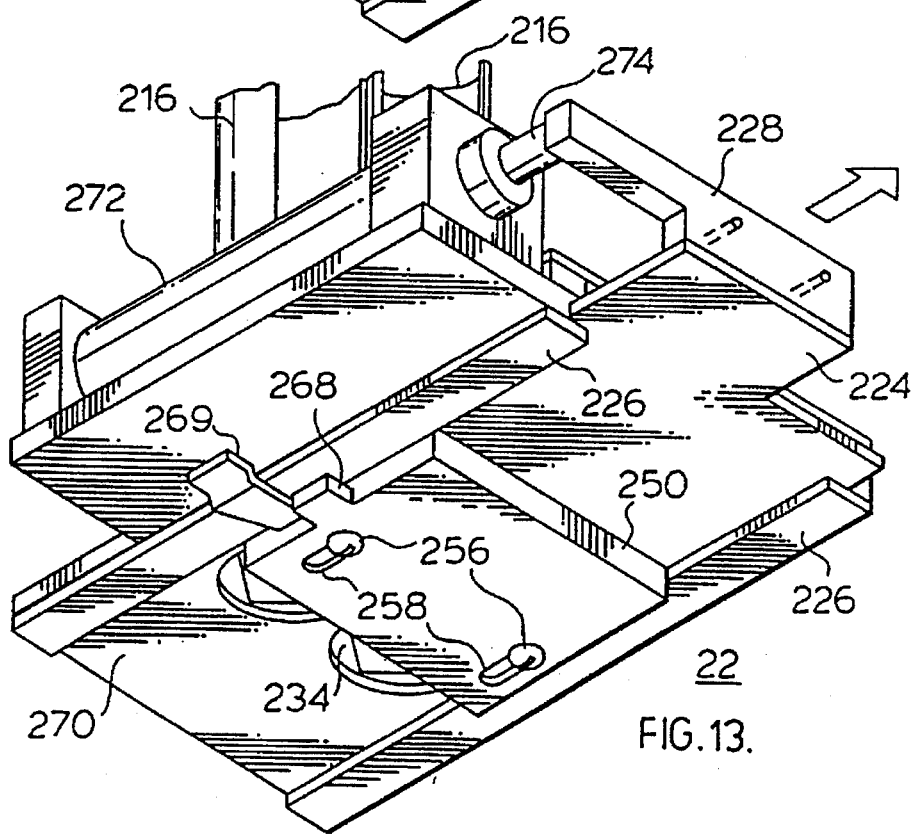
FIG. 13 is a bottom perspective view of a pepperoni-cheese slicing machine at an instant later than the position shown in FIG. 12 showing the cheese transport device in a closed position.

As soon as the dough transport device 16 swings through its arc of slightly more than 90° the dough sheet falls from its engagement with hooks 114 and trough 112 onto platen 20. At this time (FIG. 6), the tubes 120 (tomato paste 121 ) and 122 (egg mixture 123) each dispense a predetermined quantity of ingredient to the deposited dough sheet. The dough sheet now rests on the platen 20 with two selected areas covered with tomato paste 121 and egg mixture 122 (FIG. 8).

The device 16 is now retracted (FIG. 6) and returned to its previous position (FIG. 4) (slightly past the vertical) for reloading of the receptacle 108.

Pepperoni-Cheese Dispensing Operation

A pepperoni-cheese slice dispensing device 22 is now brought into close proximity (about an inch or less) of the covered dough sheet lying on platen 20. (See FIGS. 9 through 15).

Basically, device 22 comprises a base plate 200 on which is mounted a cheese shearing and transporting device and a pepperoni slicing device.

Figure 14:
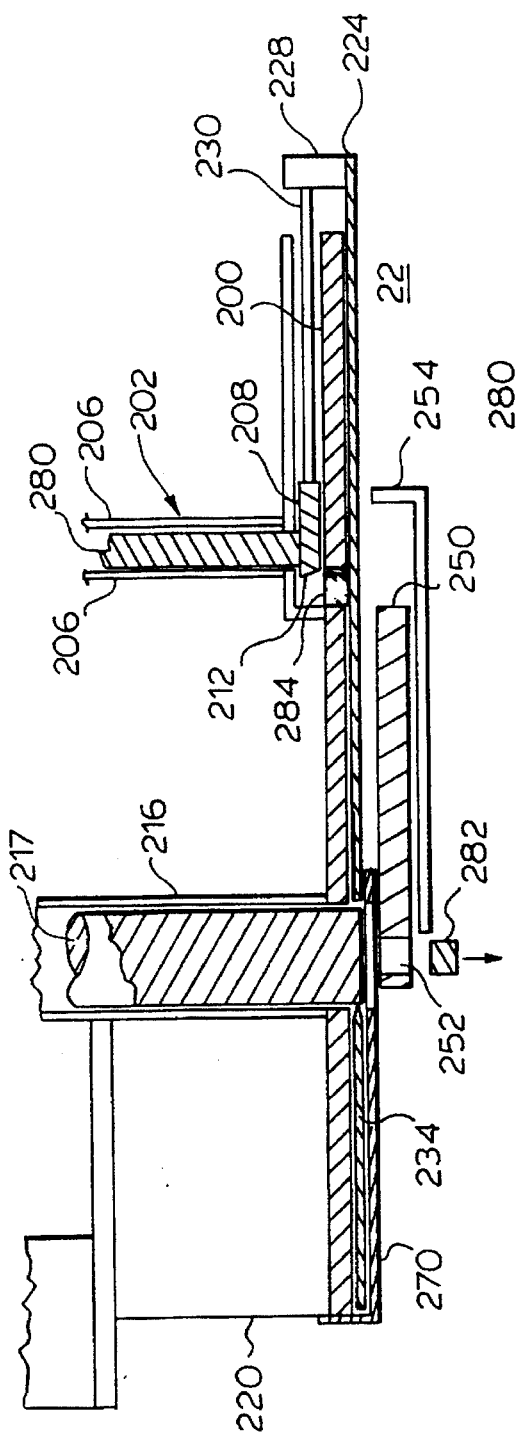
FIG. 14 is a partial sectional elevation view of the pepperoni-cheese slicing machine showing the machine in the same position as shown in FIG. 12.

Base 200 has a stationary cheese holder 202 mounted thereon for holding a slab of cheese of dimensions about ⅜"×3 ½"×20" in a vertical orientation. Cheese 280 is held via a grill work 206 in a vertical orientation. A slider shear 208 is held captive between legs 210 of the holder 202 and the edge 212 of shear 208 is sloped to provide good shearing action (FIG. 14). A dispensing aperture 214 is provided in base plate 200 to permit the sheared slice of cheese to drop through the base plate.

Base plate 200 also has a pair of hollow cylinders 216 of about 2" diameter mounted thereon for receiving rolls of pepperoni sausage 217 (unsliced). The tubes 216 are provided with vertical cutouts 218 to enable the operator to monitor consumption of this ingredient. Base 200 has a boss 220 mounted on the end thereof for mounting on the basic machine. Under the base plate is a slider track 222. Slider track 222 receives a slider member 224 which is held captive by a pair of rails 226.

Slider plate 224 is provided with boss 228 which is attached to bolts 230 attached to shear 208. Adjustment of the position of shear 208 with respect to boss 228 is accomplished by means of nuts 232. Slider 224 and shear 208 move together.

Also located on slider 224 is a knife shear 234. Knife 234 is held captive in slider and is made to be easily removable for cleaning. Knife 234 has four cutting edges 236, 238, 240 and 242. Also contained in slider is a depressed depth gauge surface 244. Surface 244 is depressed from the top surface of slider 224 by an amount equal to the desired pepperoni slice thickness. This surface 244 is depressed below the cutting surface of knife 234, the surface of which is flush with the top surface of slider 224.

Beneath surface of slider 224 is a cheese receiving and transporting device 250. Device 250 comprises a block which is fastened to the lower surface of slide 224 by bolts or other suitable mounting devices. Device 250 has a temporary cheese finger depository 252 which is closed by sheet 254. Sheet 254 is mounted beneath block 250 by means of bolts 256 which are slidably engaged in slots 258. Sheet 254 has a projection 259 which passes into a slot 260 of block 250 and engages spring 262 held captive in bore 264 of block 250. Bore 264 is closed by plug 266. Sheet 254 is urged to the left by spring engagement with projection 259.

A tang 268 is shown projecting from sheet 254. Tang 268 is engaged by stop 269 mounted on rail 226.

A stationary ledger plate 270 is shown for attaching to boss 220. Plate 270 fits immediately below and engages the lower surface of knife 234. This plate assures the final severance of the pepperoni slice from the sausage will be assured and the precise location of the severed slice will always be in the same location.

An actuator 272 is mounted on base plate 200 to move slider member 224 by rod 274 which is also attached to boss 228.

Description Of Cheese Finger Shearing And Transport

Referring to FIG. 14 wherein a slab of cheese 280 shown inserted into cheese holder 202 and cage structure 206, the cheese 280 rests on the top surface of base 200. A previously sliced finger 282 is shown leaving receptacle 252. The slider 224 is shown having moved to the far left position until in FIG. 14 where the shear 208 shears a second finger of cheese 284 from slab 280 which drops down partially through aperture 214 to rest on surface 244. Coincidentally at this time (see FIG. 12), the tang 268 has engaged a stop 269 on rail 226 which causes sheet 254 to remain stationary as block 250 moves to the left at the end of the slider 224 stroke, thus uncovering the bottom of cavity 252 allowing cheese finger 282 to drop.

Now as the slider 224 begins its motion to the right (see FIG. 13) tang 268 is disengaged from stop 269 and sheet 254 is now urged to the left on block 250 by spring 262 pushing projection 258 to close receptacle 252. Motion of slider 224 continues to the right while cheese finger 284 slides on surface 244 (so that it is essentially stationary) while being captivated by aperture 214 of base plate 200. The cheese finger 284 falls into receptacle 252 as the surface 244 moves to the right beyond aperture 214 and disappears under the base plate 200. Cheese finger 284 now occupies a storage transport position in receptacle 252. The cheese finger 284 will remain in storage receptacle 252 until slider 224 is moved to the far left so that receptacle 252 assumes the position shown in FIG. 14 and cheese finger 284 will be dropped from the receptacle 252.

Description Of Pepperoni Slicer

At the same time as cheese fingers are being sliced from the cheese block 280, slices of pepperoni are being sliced from the rounds of pepperoni which have been inserted into the holders 216 (but on alternate reciprocating strokes of slider 224).

Figure 15:
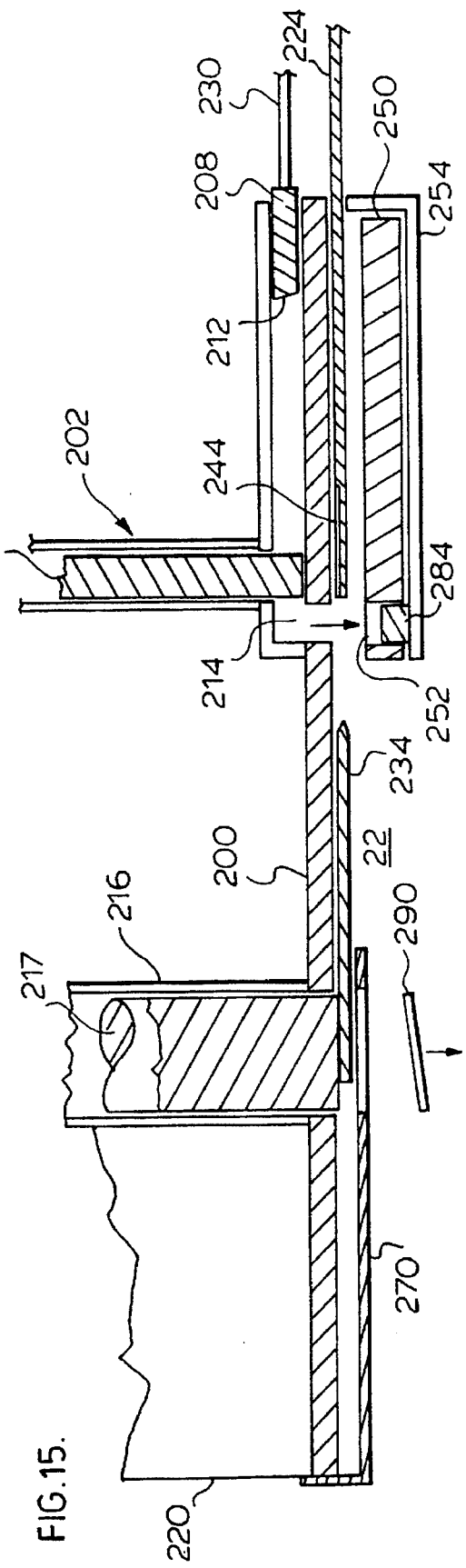
FIG. 15 is a partial sectional elevation view of the pepperoni-cheese slicing machine at the conclusion of a pepperoni slicing operation (corresponds to FIG. 11)

As shown in FIG. 15, a slice of pepperoni 290 has just been sliced from sausage 217. Slider 224 carrying knife 234 is in its far right position. Pepperoni sausage 217 is now resting on the upper surface of knife 234.

As slider 224 moves to the left, knife 234 moves to the left and gradually disengages the lower surface of pepperoni sausage 292. This permits the pepperoni sausage to drop below the surface of the knife 234 to fall to the depressed surface 244. Surface 244 has been selected to provide the correct drop of pepperoni sausage to produce the desired thickness of the pepperoni slice. The position of slider 224 and knife 234 is as shown in FIG. 14.

The slider 224 and knife 234 begin their motion to the right and the knife 234 produces a slice of pepperoni such as the one shown at 290 in FIG. 15.

The action of the pepperoni-cheese delivery device 22 is as follows:

FIG. 14 shows the position of slider 224 at the extreme left position for the cheese finger drop. This is also the position where knife 234 is ready to slice the pepperoni sausage 217. As the slider 224 begins to move to the right, it begins to slice the pepperoni 217 as shown in FIG. 14 and any pepperoni slices which are severed from the sausage are deposited on a newly deposited dough sheet 14 on platen 20 which has only deposits of tomato paste and egg mix deposited thereon in the selected locations from a previous operation. At this time, slider 224 is in the far right position (FIG. 15).

The pepperoni slices (generally 2 in number) are deposited on sheet 14 as shown in FIG. 2D. Now when the slider 224 moves to the left, the cheese transport system of device 22 moves the cheese finger to the far left to the position shown in FIG. 14 and the cheese finger such as 282 is dropped on top of the previously deposited slices of pepperoni such as 290 (see FIG. 2E). The pepperoni-cheese dispenser 22 is now retracted from its dispensing position above platen 20 and another dough sheet 14 is laid down on platen 20 for a repeat process.

Folding of Loaded Dough Slice

Figure 16:
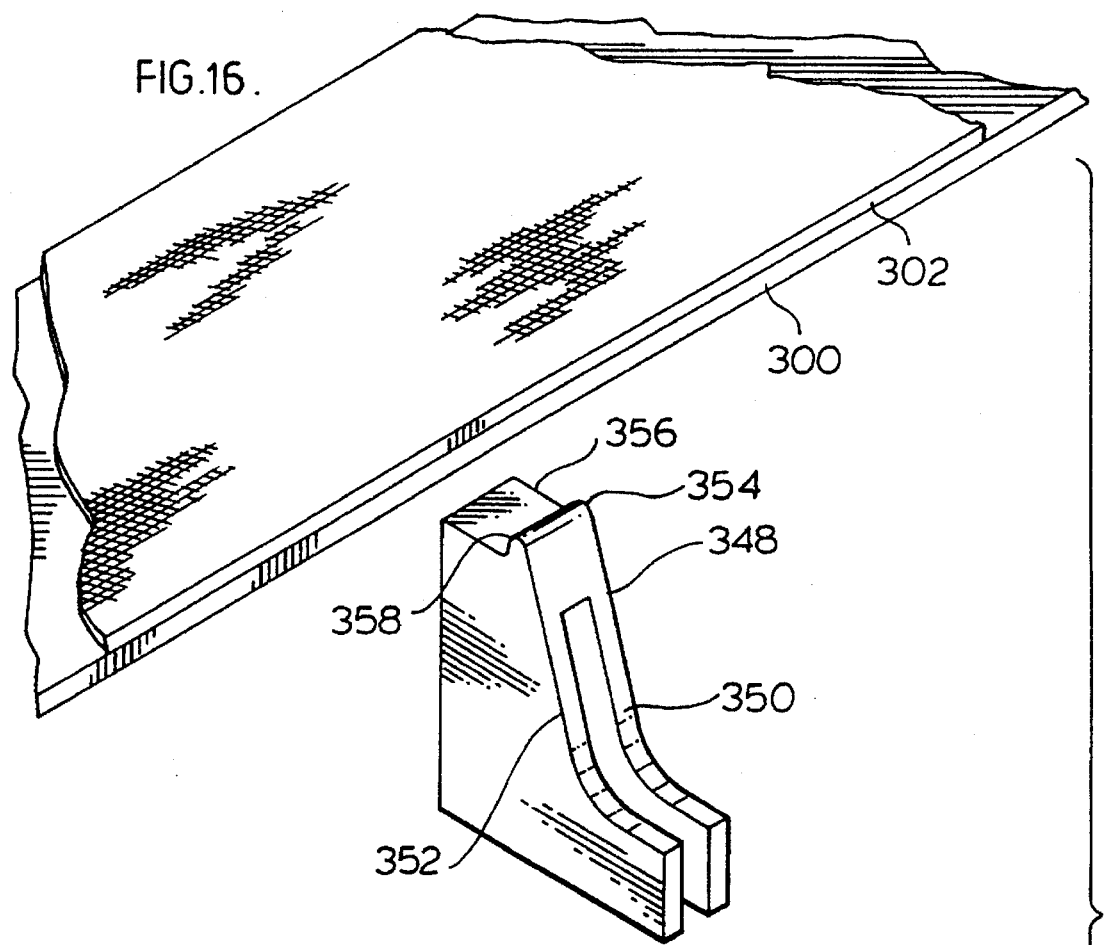
FIG. 16 shows the mechanism used to fold the edges of the dough sheet in a partial exploded view.
Figure 16:
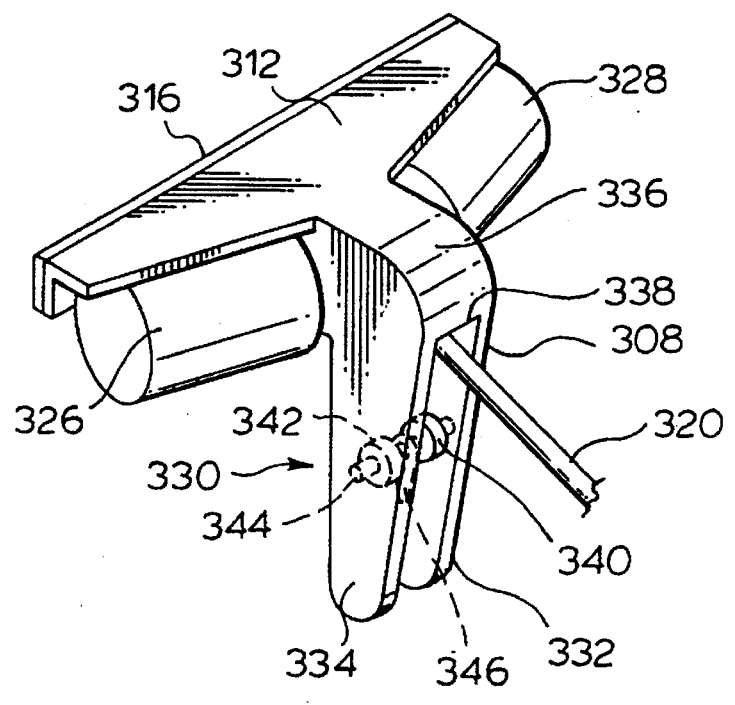

The dough slice 14 is now covered with all the desired ingredients and must be folded in folding device 24. Device 24 basically consists of a flat surface 300 which supports a fabric strip 302 which will be described in detail later. Fabric strip 302 is best shown in FIG. 16.

The points 304 and 306 of dough sheet 14 must be folded up and over the center of the dough sheet in a sequence to begin the final dough closing operation (see FIGS. 17A, 17B and 17C).

FIGS. 17A and 17B show the dough folding apparatus 24 in elevation. A pair of arms 308 and 310 are located on either side of the central supporting surface 300. The arms 308 and 310 each have an upper surface 312 and 314 respectively which is substantially triangular in shape and which with support surface 300 form the composite platen 20 which receives the cut dough sheet 14 from the dough sheet transporting device 16.

The arms 308 and 310 provide support for the two opposing corner points 304 and 306 of the dough sheet 14 and the arms 308 and 310 are made to be raised to fold each of the points 306 and 308 over the central part of the dough sheet 14. Arms 308 and 310 are faced with a tough plastic faces 316 and 318 which may be fabricated from a suitable high impact plastic such as delrin or nylon. The body of members 308 is preferably of stainless steel. Arm 308 extends downwardly and has actuating rod 320 rigidly attached thereto. Actuating rod 320 extends from cylinder 322 which swings around pivot 324.

A pair of angled rollers 326 and 328 are mounted on arm 308 just behind face 316, at an angle such that the rollers tend to attempt to roll toward the center of the platen surface. The lower portion 330 of arm 308 consists of 2 side walls 332 and 334 (FIG. 16). The rear upper surface 336 (directly behind surface 312) of arm 308 terminates at 338. A pair of wheels 340 and 342 are mounted on pin 344 which serves as an axle for the wheels 340 and 342. A dog member 346 pivots about the axle 344 midway between wheels 340 and 342.

Side walls 332 and 334 straddle a plastic template 348 (preferably nylon) which dictates the motion executed by arm 308 when actuating cylinder 322 extends rod 320. Wheels 340 and 342 follow surfaces 350 and 352 and must pass over lip 354 to reach flat surface 356. A notch 358 is located adjacent flat 356 on lip 354.

Referring to FIGS. 17A and 17B, the actuating cylinder 322 has extended rod 320 to its ultimate limit of travel. Arm 308 has been ramped up template 348 to raise the arm to lip 354.

Dough sheet 14 slides down over face 316 and as face 316 moves to the left and point 304 will be forced to cover the ingredients previously deposited on the dough sheet as shown in FIG. 2F. Rollers 326 and 328 engage the folded dough sheet and tend to neatly fix the top and bottom layers of the dough sheet 14 together especially at the fold. As wheels 340 and 342 drop over lip 354, the top and bottom dough sheets are pressed even more firmly together by rollers 326 and 328.

When the actuating rod 320 is retracted by actuating cylinder 322, dog 346 engages notch 358 and provides a sudden upward motion of arm 308 to disengage the rollers 326 and 328 from the surface of the now folded dough sheet 14. Arm 308 is retracted to its former position and arm 310 is actuated to fold point 306 over the just folded dough sheet 14 in a similar manner to the folding of dough point 304.

Rolling the Folded Dough Sheet

The folded dough sheet is now ready for the final rolling operation. The folded dough sheet 14 is now lying on the center portion of the platen 20 on a fabric cloth 302. Fabric cloth 302 has a width slightly greater than the folded dough sheet 14 but extends a substantial distance forward and behind the folded loaded dough sheet.

Sheet 302 passes through car 400 which when activated is able to roll the folded dough sheet 14. Car 400 has a pair of frame members 402 and 404 (see FIG. 17B), between which a pair of rollers 406 and 408 are rotatably mounted. A nose bar 410 extends between frame members 402 and 404 and is spaced slightly in front of roller 406. A brace member 412 also supports the frame members 402 and 404 in rigid position (see FIG. 1).

Car 400 is moved by two stages of actuation. It is pivotably attached to a pair of struts 414 and 415 to a frame member 421. Initial motion of car 400 is produced by short stroke actuator 418 which is mounted on plate 423 and which moves actuating rod 419 to move the frame member 421 and struts 414 and 415 to move car 400.

A second pair of actuator members 418A and 418B which have a longer stroke than actuator 418 are mounted on the frame of machine 10 and these actuators are connected to plate member 423 by means of actuator rods 419A and 419B. These actuators are capable of moving the whole of the previously described short stroke assembly via plate member 423 to ultimately move car 400 over a long distance during the completion of a dough rolling operation.

Frame member 404 has an integral arm 424 attached thereto which carries roller 426 at the end thereof. Roller 426 engages a groove 430 in template 432 which causes car 400 to execute a specific type of motion as car 400 travels along the fabric strip 302.

Fabric strip 302 is fastened securely to the frame of the machine at 450. The strip extends under the folded dough sheet, under nose bar 410 of car 400 and over rollers 406 and 408 of car 400. The fabric strip 302 passes over roller 452 at rear of the machine and is slightly tensioned by weight 454 (see FIG. 18A).

A press rod 460 is located adjacent the strip 302 (see FIG. 1). Rod 460 may be actuated by actuators 462 and 464 to move transversely across strip 302 and also move rod 460 in a vertical plane to engage the strip 302.

The rolling operation is as follows:

The folded dough sheet is located as shown in FIG. 18A. Car 400 is held in its tipped position with the nose bar close to the surface 300 of platen 20. Press rod 460 is located above the dough sheet and in its retracted position to one side of the strip 302 as shown in FIG. 1. Rod 460 is actuated to move over the folded dough sheet 14 while in its elevated position. When rod 460 is extended over folded dough sheet 14, actuator 462 drops rod 460 to the position shown in FIG. 18B to press the forward end of dough sheet 14 down in preparation of the rolling operation.

Actuator 418 is now actuated to move the car 400 to the left. As car 400 moves to the left, roller 426 moves from point 466 (i.e. nose bar 410 down) to position 468, (nose bar 410 at highest point) as shown in FIG. 18B.

The rolling continues with rod 460 maintained in place until actuator 418 reaches the limit of its stroke. At this time, actuator rod 419 is locked in its fully extended position FIG. 18C and rod 460 is now withdrawn by actuation of actuators 462 and 464.

Motion of car 400 is continued to the left by actuators 418A and 418B. These actuators are long stroke devices which push the car via struts 414 and 415, frame 421, locked actuator rod 419 and actuator 418 which is mounted on plate 423. When actuators 418A and B begin their motion, car 400 will move to the left so that roller 426 leaves slot 430 in block 432 and the nose roller 406 bears down on the dough sheet and the fabric strip 302 produces a moving curved surface as shown in FIGS. 18D, 18E and 18F which forces the previously folded dough sheet 14 to roll itself up. As car 400 finishes motion to the left, the dough sheet is completely rolled as shown in FIG. 18F.

This disclosure describes a novel machine which may be used to make a novel food product, a pizza finger. The machine may be adapted to produce other filled food products of a rolled nature; certainly the folding and rolling mechanisms may be utilized to produce a folded and rolled food product.

The dough sheet transfer apparatus may be used advantageously to transfer any dough sheet from a dough strip dispenser to a worksurface; it is simple, economical and essentially trouble free. For this application the problem of obtaining a good registry of the food ingredients on the dough sheet is essentially solved by means of the food ingredients being applied directly to the dough sheet by the dough sheet transfer apparatus.

The cheese and pepperoni slicing apparatus is probably more limited in its application in the food industry, however, those skilled in the art will readily understand that the pepperoni slices must be accurately and uniformly placed and so must each cheese finger. The order of delivery is very important, because any misplaced pepperoni slice or cheese finger tends to interfere with the folding process. It is therefore important that these items are exactly placed and delivered in the described sequence above.

A word about the food products used in this invention. The pepperoni sausages must be of such size as to slide in the storage sleeves, to allow uniform slices to be produced. The pepperoni sausage slices satisfactorily at room temperature (or slightly below) by the apparatus of this invention.

The mozzarella cheese shearing device works acceptably well with most brands of mozzarella cheese. Because the physical characteristics of the mozzarella cheese are subject to substantial changes with changes in temperature, sometimes it will be advantageous to store the mozzarella slabs in a refrigerated environment before insertion into the cheese shearing apparatus.

The tomato paste and egg mixture are standard food products that may be purchased commercially. Those skilled in the art will have adequate knowledge of the flavors and viscosities which are desirable to make the end product attractive, flavorful and physically stable.

Both food ingredients above are supplied by commercial food pumps and metering devices that are readily available in the commercial food machinery marketplace. The pumping and metering equipment are well known to person skilled in the art, and have not been described, and do not form any part of this invention.

The fabric strip 302 is a commercial fabric which is readily available for rolling and forming food products which are amenable to such a process.

The equipment which is described herein is complex and minor variations will no doubt be obvious once the specification has become available to those skilled in the art. Applicant, however, wishes to limit the protection of his invention only by the scope of the following claims.

I claim:

1. A machine for slicing and placing slices of a meat sausage and pieces of cheese on a flat medium so that the meat sausage slice is placed first on said medium and the piece of cheese is placed upon said meat sausage slice, said machine comprising:

storage means on said machine for storing a bulk cheese slab and bulk meat sausage at two separate locations on said machine, cutting means for severing sausage slices from said bulk sausage and cheese pieces from said bulk cheese slab, sausage slice placing means for placing a sausage slice in a specific location on said medium, and cheese piece transporting means for carrying a cheese piece to a point above said placed sausage slice, and placing said cheese piece on top of said placed sausage slice.

2. A machine as claimed in claim 1 wherein said bulk cheese slab comprises an elongated slab of cheese of preselected dimensions.

3. A machine as claimed in claim 2 wherein said meat sausage and cheese slab are stored in a vertical orientation in said storage means.

4. A machine as claimed in claim 3 wherein said storage means comprises a meat storage device and a cheese storage device located adjacent each other on said machine.

5. A machine as claimed in claim 4 wherein said cutting means in said machine comprises a meat cutting device and a separate cheese cutting device actuated by reciprocating means to move said meat cutting device and cheese cutting device in concert in said machine.

6. A machine as claimed in claim 5 wherein a piece of cheese is produced on a first stroke of said reciprocating means and a meat slice is produced on the next alternate stroke of said reciprocating means.

7. A machine as claimed in claim 6 wherein said cheese cutting device is a shear and said meat cutting device is a knife.

8. A machine as claimed in claim 7 wherein said piece of cheese is a finger.

9. A machine as claimed in claim 8 wherein said cheese is mozzarella and said meat sausage is a pepperoni sausage.

10. A machine as claimed in claim 9 wherein said transport means is actuated by said reciprocating means to remove a sliced finger of mozzarella cheese from the point where it was sliced, to a point above a previously laid down pepperoni slice.

11. A machine as claimed in claim 10 wherein said medium is a dough sheet.

12. A machine for slicing both fingers of cheese from a bulk elongated cheese slab and slices of pepperoni from a pepperoni sausage and depositing both the pepperoni slice and the cheese finger onto a flat surface so that the cheese finger is deposited on top of the pepperoni slice comprising:

a pepperoni storage device for storing at least one sausage of pepperoni in a vertical orientation, slicing means on said machine for slicing a slice of pepperoni from the lower end of said sausage stored in said pepperoni storage device and allowing the slice of pepperoni to fall to said flat surface immediately below and spaced a short distance from the bottom of said pepperoni sausage, storage means for said bulk cheese slab to maintain said cheese slab in a vertical orientation, cheese cutting means on said machine moving in concert with said pepperoni slicing means to sever a finger of cheese from the bottom of said bulk slab of cheese stored in said cheese storage device and temporarily storing said cheese finger so produced in cheese transport means for delivery to a point immediately below the lower end of said stored pepperoni sausage, and activating means to activate said cheese transport device to deposit said cheese finger onto a previously placed slice of pepperoni sausage on said flat surface.

13. A machine as claimed in claim 12 wherein said machine has a reciprocating means which alternately slices slices of pepperoni and fingers of cheese.

14. A machine as claimed in claim 13 wherein said cheese is mozzarella.

15. A machine for slicing bulk meat and cheese and delivering said meat and cheese in sequence to a surface just below said machine so that a piece of sliced cheese is precisely deposited on at least one piece of previously deposited sliced meat to said surface, said machine comprising storage means to store rounds of processed meat sausage and elongated cheese slabs in vertical storage devices in their unsliced state comprising, a flat base member having said meat and cheese storage means attached to the top surface of said base member, a sliding member mounted in a co-operating sliding relationship on the lower surface of base member, said sliding member having a flat meat slicing means and a cheese slicing means mounted thereon for moving in concert with said sliding member said base member having an aperture therein for allowing each stored meat sausage round to pass there through for slicing, said sliding member having a flat recessed surface located adjacent said flat meat slicing knife so that after a slice of meat has been sliced, said flat recessed surface is pulled beneath said bulk meat sausage to permit said meat round to drop the distance of said recess, and subsequently reciprocating said sliding member to cause said flat knife to slice another slice of said meat sausage, and simultaneously producing a finger of cheese from said bulk cheese slab while said meat knife is being retracted comprising, reciprocating cheese shear means attached to said sliding member to move therewith, said cheese shear co-operating with a ledger member incorporated in said bulk cheese storage device located adjacent said base member to produce a finger of cheese as said shear moves past said ledger member, during a meat knife retraction step, said base having a cheese finger aperture therein to receive said sheared cheese finger for temporary storage after being sheared from said bulk slab, said cheese being captive in said aperture during the next reciprocating slider motion during which time said meat is being sliced, said cheese finger being urged into a cheese finger storage member attached to said sliding member at the end of the meat slicing reciprocation, said cheese finger storage member moving with said sliding member to a point immediately below said bulk meat sausage storage means, and opening to drop said cheese finger from said cheese finger storage member at the end of the meat knife retraction reciprocating cycle.

* * * * *